(12) United States Patent     (10) Patent No.:   US 12,592,650 B2
Shen et al.     (45) Date of Patent:    Mar. 31, 2026

(54) ASYMMETRIC HALF-BRIDGE POWER SUPPLIES AND CONTROL METHODS THEREOF

(71) Applicant: ARK HDPS SEMICONDUCTOR PTE. LIMITED., Singapore (SG)

(72) Inventors: Yi-Lun Shen, Taipei (TW); Yu-Yun Huang, Taipei (TW)

(73) Assignee: Ark HDPS Semiconductor Pte. LIMITED., Singapore (SG)

( * ) Notice: Subject to any disclaimer, the term of this patent is extended or adjusted under 35 U.S.C. 154(b) by 223 days.

(21) Appl. No.: 18/603,179

(22) Filed: Mar. 12, 2024

(65) Prior Publication Data

US 2024/0313662 A1    Sep. 19, 2024

(30) Foreign Application Priority Data

Mar. 13, 2023    (CN) .......................... 202310233809.8

(51) Int. Cl.
    *H02M 3/335*       (2006.01)
    *H02M 1/00*        (2007.01)
             (Continued)

(52) U.S. Cl.
    CPC ..... *H02M 3/33592* (2013.01); *H02M 1/0058* (2021.05); *H02M 1/083* (2013.01);
             (Continued)

(58) Field of Classification Search
    CPC ............... H02M 3/01; H02M 3/33523; H02M 3/33592; H02M 1/0058
    See application file for complete search history.

(56) References Cited

U.S. PATENT DOCUMENTS

| | | | |
|---|---|---|---|
| 10,892,687 | B2 | 1/2021 | Fahlenkamp |
| 2014/0254204 | A1 | 9/2014 | Kao |

(Continued)

FOREIGN PATENT DOCUMENTS

| | | |
|---|---|---|
| CN | 101882875 A | 11/2010 |
| CN | 104779806 A | 7/2015 |

(Continued)

OTHER PUBLICATIONS

Shen, the specification, including the claims, and drawings in the U.S. Appl. No. 18/597,951, filed Mar. 7, 2024.

*Primary Examiner* — Thienvu V Tran
*Assistant Examiner* — Jennifer C Caulk
(74) *Attorney, Agent, or Firm* — Winston Hsu

(57)           ABSTRACT

A control method is disclosed for an asymmetric half-bridge power supply having a resonant circuit, a first switch, a second switch, and an assisting switch. The resonant circuit includes a transformer and a resonance capacitor. The transformer has a primary winding connected to the resonance capacitor and an auxiliary winding connected to the assisting switch. Within a switching cycle, the first switch is turned on for a first ON time to increase an exciting current of the transformer. After the first ON time, the second switch is turned on for a second ON time to decrease the exciting current. Whether a discharge duration of the transformer ends is detected. The assisting switch is turned ON after the end of the discharge duration, making the exciting current negative, so as to assist the first switch achieving ZVS.

20 Claims, 10 Drawing Sheets

(51) Int. Cl.
H02M 1/08 (2006.01)
H02M 3/00 (2006.01)
(52) U.S. Cl.
CPC ......... H02M 3/01 (2021.05); H02M 3/33523 (2013.01); H02M 3/33571 (2021.05)

(56) References Cited

U.S. PATENT DOCUMENTS

| | | | |
|---|---|---|---|
| 2015/0263629 | A1 | 9/2015 | Stuler |
| 2016/0020699 | A1 | 1/2016 | Shen |
| 2021/0408921 | A1 | 12/2021 | Yang |
| 2022/0271676 | A1 | 8/2022 | Yang |
| 2022/0294358 | A1 | 9/2022 | Wang |
| 2022/0416644 | A1 | 12/2022 | Xu |
| 2024/0305207 | A1 | 9/2024 | Liu |

FOREIGN PATENT DOCUMENTS

| | | | | | | |
|---|---|---|---|---|---|---|
| CN | 105375783 | A | | 3/2016 | | |
| CN | 104779806 | B | | 11/2017 | | |
| CN | 110224612 | A | * | 9/2019 | ........ | H02M 3/33569 |
| CN | 111010036 | A | | 4/2020 | | |
| CN | 113937988 | A | * | 1/2022 | .......... | H02M 1/0009 |
| CN | 216699838 | U | | 6/2022 | | |
| CN | 115037159 | A | * | 9/2022 | .......... | H02M 1/0054 |
| CN | 115118174 | A | | 9/2022 | | |
| CN | 217508617 | U | | 9/2022 | | |
| CN | 115549478 | A | * | 12/2022 | .......... | H02M 1/0058 |
| TW | 200529541 | | | 9/2005 | | |
| TW | 200529544 | | | 9/2005 | | |
| TW | M457354 | U1 | | 7/2013 | | |
| TW | 201433064 | A | | 8/2014 | | |
| TW | I514740 | B | | 12/2015 | | |
| TW | I514742 | B | | 12/2015 | | |
| TW | 1627825 | B | | 6/2018 | | |
| TW | 202135442 | A | | 9/2021 | | |
| TW | 202135452 | A | | 9/2021 | | |
| TW | 202308282 | A | | 2/2023 | | |
| WO | 2016/033112 | A1 | | 3/2016 | | |
| WO | 2020/248472 | A1 | | 12/2020 | | |

* cited by examiner

MS3

SN2

Slope variation occurs in V<sub>DET</sub> in the rest duration?

No

Yes    SN4

Increase the assisting duration

SN6

Decrease the assisting duration

ASYMMETRIC HALF-BRIDGE POWER SUPPLIES AND CONTROL METHODS THEREOF

BACKGROUND OF THE INVENTION

1. Field of the Invention

The present invention generally relates to an asymmetrical half-bridge power supply and the control method, especially to a control method capable of enabling the upper switch or the lower switch in the asymmetrical half-bridge power supply to achieve zero-voltage switching.

2. Description of the Prior Art

A power supply is a device for converting an input power into one or more output powers for various electronic products. As the demand for portable devices increases, power supplies having high power, high efficiency and small size gain growing interest.

One type of such a power supply is the asymmetric half-bridge (AHB) power supply. The AHB power has a transformer, is simple in structure and may provide power greater than 100 W. The power supply has a high-side switch and a low-side switch on the primary side of the transformer configured in a half-bridge configuration, and provides different pulse width modulation (PWM) signals to the high-side switch and the low-side switch, hence the name "asymmetric". The transformer in the AHB power supply is also coupled to a resonance capacitor on the primary side to form a resonance circuit.

During a heavy load condition, the AHB power supply switches the high-side switch and the low-side switch in a substantially complementary manner in a switching cycle. The resonance circuit performs charging, discharging and resonance for the high-side switch and the low-side switch to achieve zero voltage switching (ZVS) and low switching loss, and increase conversion efficiency.

During a medium or light load condition, one way to reduce the switching loss is to increase the switching cycle, that is, reducing the switching frequency. However, when the switching cycle of the AHB power supply increases, it becomes a technical challenge to maintain ZVS at the high-side switch and the low-side switch.

Chinese Patent No. CN111010036A teaches a control technique for the AHB power supply. During the light load condition, in one switching cycle, the high-side switch of the AHB power supply is only turned on for once (and stays ON for a period of time), while the low-side switch is turned on for twice. Specifically, the low-side switch is turned on for the first time after the high-side switch is turned on, and turned on for the second time before the high-side switch is turned on in the next switching cycle.

Chinese Patent No. CN104779806 teaches another control technique for the AHB power supply. In a switching cycle, the high-side switch of the AHB power supply is only turned on for once, and the low-side switch is only turned on for once. During the heavy load condition, the low-side switch is turned on after the high-side switch is turned on. During the light load condition, the low-side switch is turned on before turning on the high-side switch in the next switching cycle.

SUMMARY OF THE INVENTION

According to an embodiment of the invention, a control method for an asymmetric half-bridge power supply is provided. The asymmetric half-bridge power supply includes a resonance circuit, a first switch and a second switch, and an assisting switch. The resonance circuit includes a first auxiliary winding, a transformer and a resonance capacitor. The transformer includes a primary winding, an assisting winding. The primary winding and the assisting winding are inductively coupled to each other, and the first auxiliary winding is located on a primary side of the transformer. The resonance capacitor is coupled to the primary winding. The first switch and the second switch are coupled in series between an input power line and an input ground line to control the resonance circuit, one terminal of the first switch and one terminal of the second switch being coupled to an output node. The assisting switch is coupled to the assisting winding. The method includes the following steps in a switching cycle: turning on the first switch for a first ON time after a declining slope of a winding voltage of the first auxiliary winding exceeds a preset threshold, turning on the second switch for a second ON time after an end of the first ON time, detecting a discharge duration of the transformer after an end of the second ON time, and turning on the assisting switch for an assisting duration after the discharge duration, so as to assist the first switch to achieve zero-voltage switching in a next switching cycle via the assisting winding.

According to another embodiment of the invention, a control method of an asymmetrical half-bridge power supply includes asymmetrically controlling a first ON time of a first switch and a second ON time of a second switch to convert an input voltage into an output voltage via a transformer, the transformer comprising a primary winding, a first auxiliary winding and a secondary winding, wherein the first switch and the second switch control a resonance circuit, the resonance circuit comprises the transformer and a resonance capacitor, and the secondary winding is coupled to a synchronous rectifier switch, and providing a switching cycle time limit according to the output voltage. The method further includes turning on the synchronous rectifier switch for an assisting duration after the switching cycle time limit is reached, turning on the first switch to start a switching cycle after turning on the synchronous rectifier switch for the assisting duration, detecting a winding voltage of the first auxiliary winding, wherein during the second ON time, the winding voltage of the first auxiliary winding is a substantially constant value, and turning on the first switch when the winding voltage deviates from the substantially constant value and a declining slope of the winding voltage exceeds a preset threshold.

According to another embodiment of the invention, an asymmetrical half-bridge power supply for converting an input power on a primary side to an output power on a secondary side includes a resonance circuit, a first switch and a second switch, an assisting switch and a power controller. The resonance circuit includes a transformer including a primary winding, a first auxiliary winding, and an assisting winding, and a resonance capacitor coupled to the primary winding. The first switch and a second switch are coupled in series on the primary side between an input power line and an input ground line to control a magnetization current flowing through the resonance circuit. The assisting switch is coupled to the assisting winding. The power controller is used to first turn on the first switch for a first ON time and then turn on the second switch for a second ON time in a switching cycle, wherein the power controller turns on the first switch for the first ON time after a declining slope of a winding voltage of the first auxiliary winding exceeds a preset threshold. After a discharge duration of the transformer is completed, the assisting switch is turned on for an assisting duration to enable one of the first switch and the second switch to achieve zero-voltage switching in a next switching cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
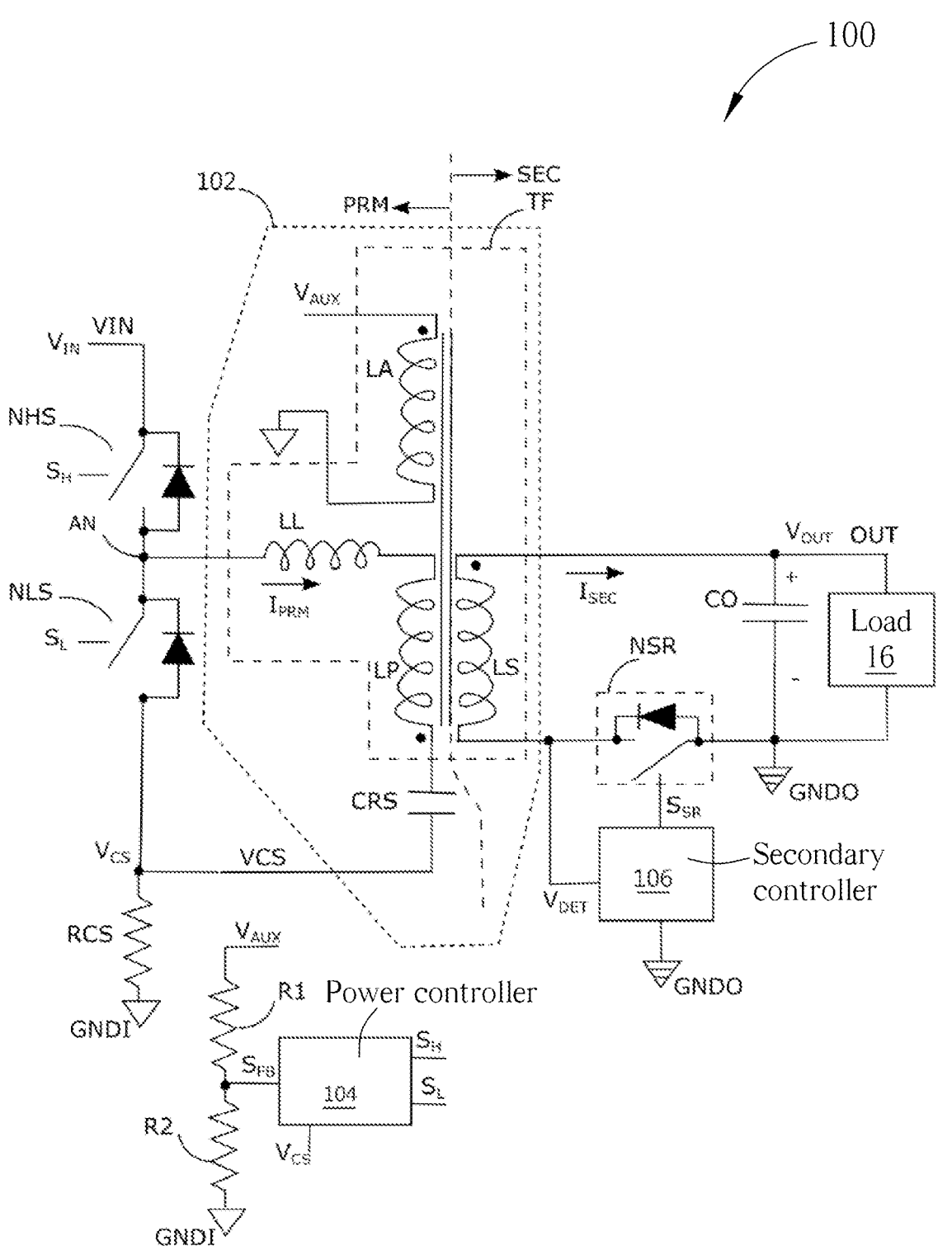
FIG. 1 shows an AHB power supply according to an embodiment of the invention.

As used herein, components/elements with the same symbols represent elements having the same or similar structures, functions, and operating principles, and may be deduced by those skilled in the art according to the teaching of the specification. The explanation for the components/elements having the same symbols will not be repeated for brevity.

In the embodiment of the invention, one of the high-side switch and the low-side switch may be referred to as the first switch, and the other one may be referred to as the second switch. For example, the high-side switch is the first switch and the low-side switch is the second switch. In another example, the low-side switch is the first switch, and the high-side switch is the second switch. In the following discussion, the high-side switch is the first switch and the low-side switch is the second switch.

According to an embodiment of the invention, an AHB power supply includes a transformer having a primary winding on a primary side, and an assisting winding coupled to an assisting switch. In a switching cycle, when both the high-side switch and the low-side switch are turned off and a discharge duration of the transformer is completed, the assisting switch may be switched from OFF to ON and remain ON for an assisting duration, or may be ON initially and stay ON for an additional assisting duration. During the assisting duration, energy may be supplied to the transformer via the assisting winding, so that when the next switching cycle begins and the high-side switch is about to be turned on, the voltage difference between the source and drain terminals of the high-side switch is reduced, achieving ZVS and high conversion efficiency for the high-side switch.

In this specification, the discharge duration of the transformer refers to the duration during which the transformer may output current/energy to the load after magnetization, and the discharge duration may be detected from the primary side or the secondary side.

For the heavy load condition, the AHB power supply according to the invention may be operated in a critical mode (CRM); and for the light load condition, the AHB power supply may be operated in a discontinuous-conduction mode (DCM).

In some embodiments, both the assisting winding and the assisting switch are located on the secondary side of the transformer, and the assisting winding and the assisting switch are a secondary winding of the transformer and a synchronous rectifier switch, respectively. The assisting winding is coupled to the output of the transformer. In other embodiments, both the assisting winding and the assisting switch are located on the primary side of the transformer, the assisting winding is a second auxiliary winding of the transformer, and the assisting switch is coupled between an auxiliary capacitor and the second auxiliary winding.

In some embodiments, the synchronous rectifier switch may serve as the assisting switch to trigger a power controller on the primary side (also referred to as the primary side controller) to turn on the high-side switch or low-side switch for starting a new switching cycle. The AHB power supply may have a photo-less structure, or may have a photocoupler structure.

In the embodiment, the AHB power supply, the assisting duration of the assisting switch may be automatically and adaptively adjusted to provide just enough energy to the transformer so that the high-side switch can achieve ZVS.

FIG. 1 shows an AHB power supply 100 according to an embodiment of the invention. The AHB power supply 100 converts an input voltage $V_{IN}$ on the primary side PRM into an output voltage $V_{OUT}$ on the secondary side SEC. The AHB power supply 100 has a resonance circuit 102, an high-side switch NHS, a low-side switch NLS, a current sensing resistor RCS, voltage dividing resistors R1 and R2, a power controller 104, an output capacitor CO, a synchronous rectifier switch NSR, and a secondary controller 106, the electrical connections thereof are as shown in FIG. 1. On the primary side PRM, the high-side switch NHS and the low-side switch NLS are coupled in series between the input power line VIN and the input ground line GNDI, one terminal of the high-side switch NHS and one terminal of the low-side switch NLS are coupled to an output node AN, and the high-side switch NHS and the low-side switch NLS are used to control the resonance circuit 102. In the resonance circuit 102, the transformer TF has a primary winding LP, a leakage inductance LL, and a first auxiliary winding LA on the primary side PRM. The resonance capacitor CRS is coupled between the primary winding LP and the current detection resistor RCS. A detection terminal VCS of the current detection resistor RCS has a current detection signal $V_{CS}$. The voltage dividing resistors R1 and R2 are coupled in series between one terminal of the first auxiliary winding LA and the input ground line GNDI, and a connection node between the voltage dividing resistors R1 and R2 provides a feedback signal $S_{FB}$ to the power controller 104. The power controller 104 may detect a winding voltage $V_{AUX}$ at one terminal of the first auxiliary winding LA by detecting the feedback signal $S_{FB}$ to generate a control signal Su and a control signal $S_L$, and the control signals $S_H$ and $S_L$ control the high-side switch NHS and low-side switch NLS, respectively.

The transformer TF has a secondary winding LS and a synchronous rectifier switch NSR coupled in series on the secondary side SEC, both the secondary winding LS and the synchronous rectifier switch NSR are coupled in series between the output power line OUT and the output ground line GNDO. The secondary controller 106 generates a control signal $S_{SR}$ according to the voltage signal $V_{DET}$ to control the synchronous rectifier switch NSR.

Figure 10:
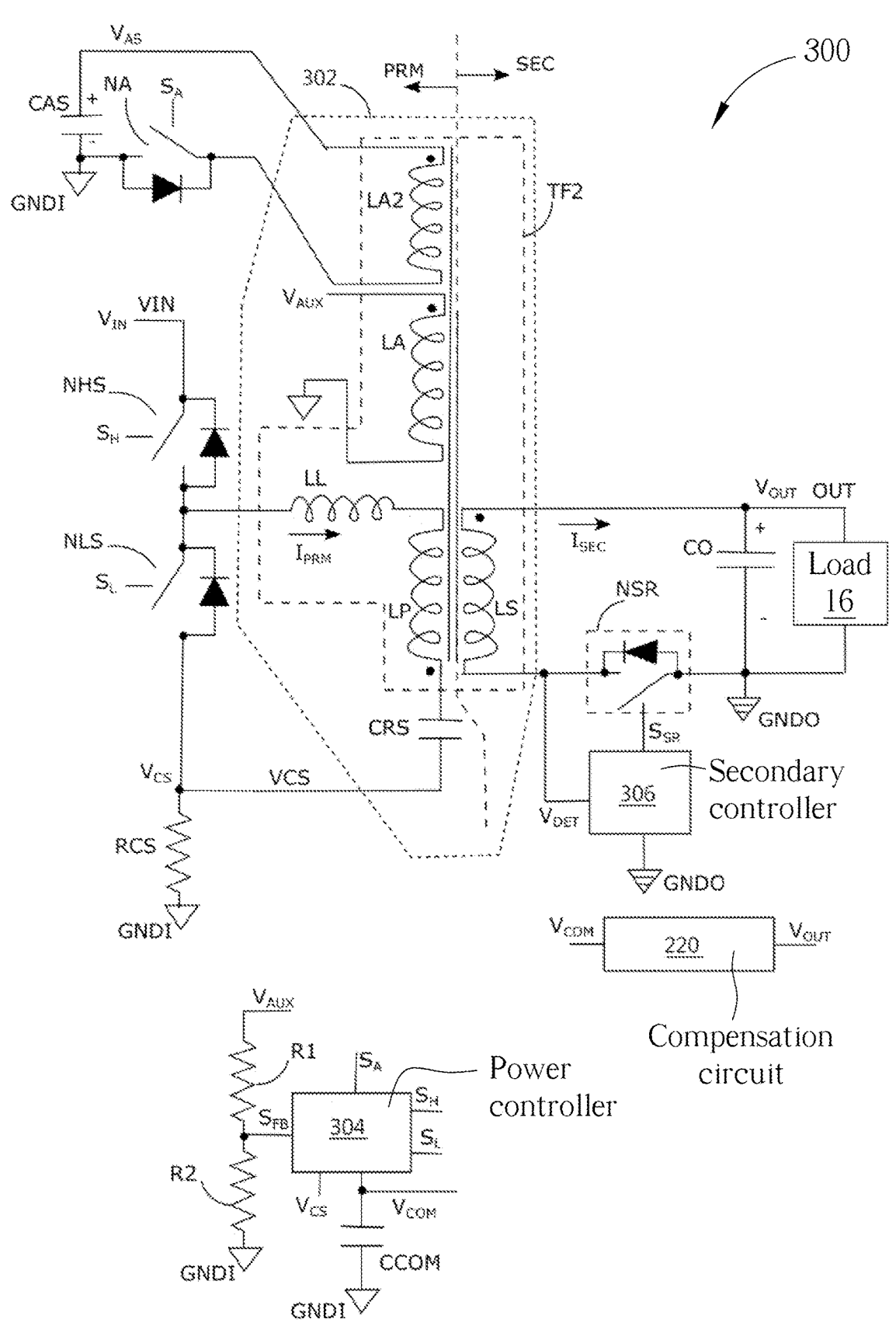
FIG. 10 shows an AHB power supply according to another embodiment of the invention.

In FIG. 1, the secondary controller 106 and the synchronous rectifier switch NSR on the secondary side SEC may serve as the controller and the assisting switch, respectively. It will be shown later, that after a discharge duration is completed, the secondary controller 106 will (1) first turn off the synchronous rectifier switch NSR and then turn on the synchronous rectifier switch NSR again or (2) keep turning on the synchronous rectifier switch NSR to assist the high-side switch NHS to achieve ZVS. In FIG. 10, the assisting switch NA and the power controller 304 may be located on the primary side PRM to assist the high-side switch NHS to achieve ZVS.

Figure 2:
FIG. 2 shows the AHB power supply of FIG. 1 operating in DCM.

FIG. 2 shows the switching cycle TCYC1 (from Time t11 to t1E) and related waveforms when the AHB power supply 100 in FIG. 1 is operated in DCM. From top to bottom, FIG. 2 shows the control signals $S_H$ and $S_L$ (respectively representing the state of the high-side switch NHS and the state of the low-side switch NLS), the magnetization current $I_{MAG}$ of the transformer TF, the leakage inductance current $I_{PRM}$ on primary side PRM flowing through the leakage inductance LL and the primary winding LP, the winding voltage $V_{AUX}$, the control signal $S_{SR}$, the voltage signal $V_{DET}$, and the current $I_{SEC}$ flowing from the secondary winding LS to the output capacitor CO. In FIG. 2, the winding voltage $V_{AUX}$, the control signals $S_H$ and $S_L$, the magnetization current $I_{MAG}$ and the leakage inductance current $I_{PRM}$ are located on the primary side PRM, while the control signal $S_{SR}$, the voltage signal $V_{DET}$ and the current $I_{SEC}$ are located on the secondary side SEC. The magnetization current $I_{MAG}$ of the transformer TF generally represents the mutual inductive magnetic flux of the primary winding LP, the secondary winding LS and the first auxiliary winding LA. Due to inductive coupling, the winding voltage $V_{AUX}$ is substantially an inverse of the voltage signal $V_{DET}$, as shown in FIG. 2.

Figures 3A, 3B:
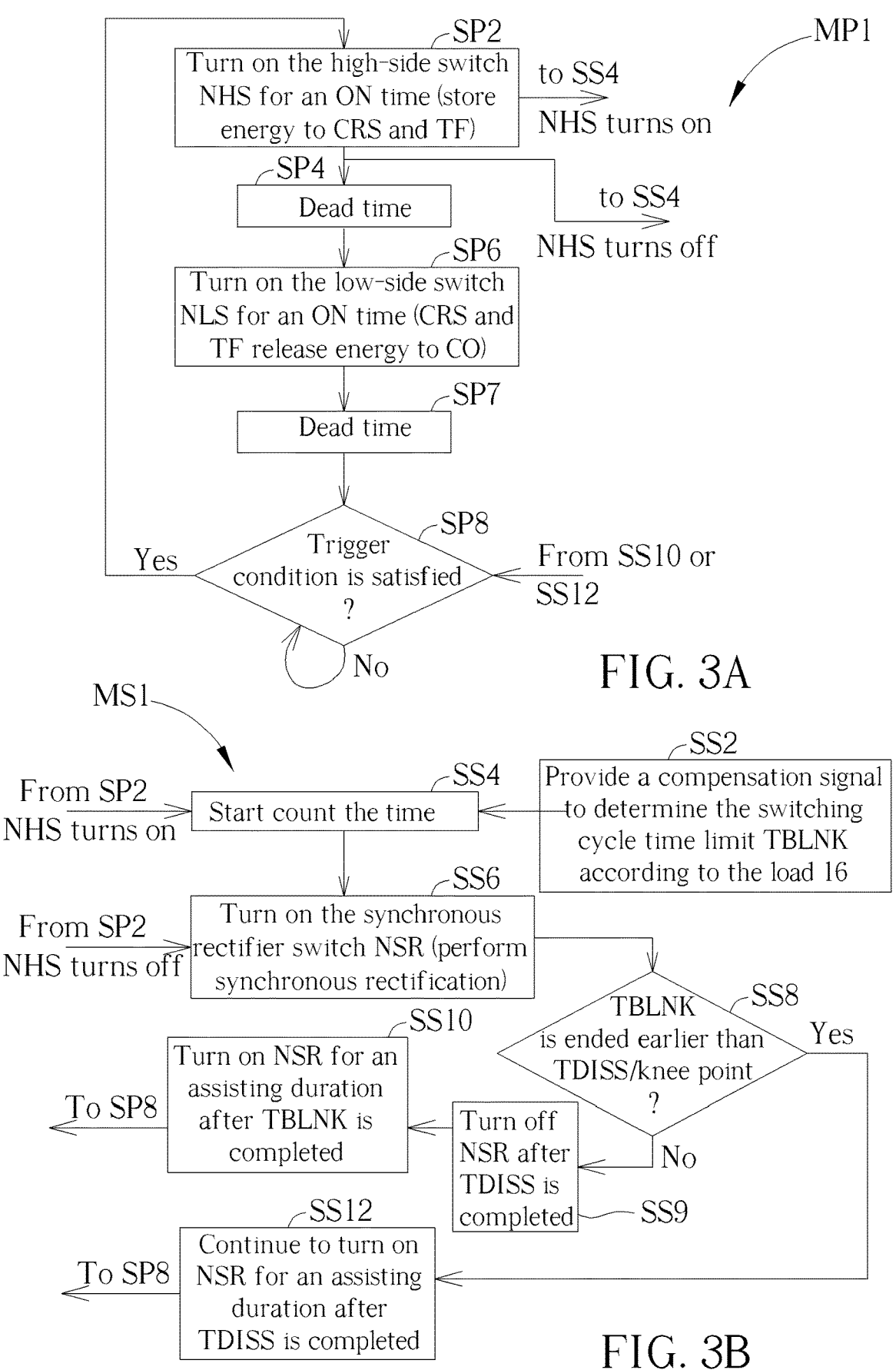
FIG. 3A shows a control method MP1 adopted by the power controller in FIG. 1.
FIG. 3B shows a control method MS1 adopted by the secondary controller in FIG. 1.

FIGS. 3A and 3B respectively show a control method MP1 adopted by the power controller 104 and a control method MS1 adopted by the secondary controller 106, and may be explained with reference to the waveforms in FIG. 2. The control methods MP1 and MS1 in FIGS. 3A and 3B will show that the AHB power supply 100 has a photo-less structure without adopting a photo coupler. The switching cycle is initiated by the secondary controller 106 to trigger the power controller 104, and the secondary controller 106 ensures that the switching cycle is no less than a minimum switching cycle. Nevertheless, the invention is not limited to the AHB power supply adopting the photo-less structure. In other embodiments as discussed later, the AHB power supply has a photo coupler for use to transmit the information corresponding to the load 16 on the secondary side SEC to the primary side PRM.

Referring to FIG. 2 and FIG. 3A, in Step SP2, the power controller 104 turns on the high-side switch NHS for an ON time TOH1 (from Time t11 to t12) according to the winding voltage $V_{AUX}$. For example, since a trigger condition (as will be discussed later) occurs in the winding voltage $V_{AUX}$ before Time t11, the power controller 104 starts to turn on the high-side switch NHS at Time t11. The length of the ON time TOH1 may be determined by a previous switching cycle TCYC1 or a plurality of switching cycles. For example, the power controller 104 includes a correspondence between the switching cycle and the ON time TOH1. The longer the immediately preceding switching cycle is, the shorter the ON time TOH1 will be. For example, the power controller 104 internally converts a compensation signal according to a signal from the immediately preceding switching cycle. The compensation signal may be used to determine the peak value of the current detection signal $V_{CS}$, and also determine the ON time TOH1.

During the ON time TOH1, the input voltage $V_{IN}$ charges the resonance capacitor CRS and the transformer TF. The waveforms of the magnetization current $I_{MAG}$ and the leakage inductance current $I_{PRM}$ substantially overlap each other, and increase substantially with time to become positive in value. Both the winding voltage $V_{AUX}$ and the voltage signal $V_{DET}$ are substantially constant, corresponding to the voltage across the primary winding LP.

In Step SP4, the power controller 104 simultaneously turns off the high-side switch NHS and the low-side switch NHL for a dead time TD11 (from Time t12 to t13). The dead time TD11 may prevent the high-side switch NHS and the low-side switch NHL from being accidentally turned on simultaneously, preventing a short circuit between the input power line VIN and the input ground line GND1 and the risk of circuit breakdown. In one embodiment, the dead time TD11 may be fixed in time length. In another embodiment, the dead time TD11 is ended at Time t13, Time t13 being determined by a fixed delay time after the winding voltage $V_{AUX}$ rises to reach 0 volt (the voltage of the input ground line GND1).

In Step SP6, the power controller 104 turns on the low-side switch NLS for an ON time TOL1 (from Time t13 to t14) to reduce the magnetization current $I_{MAG}$. During the ON time TOL1, the winding voltage $V_{AUX}$ is substantially at a constant value $V_{RO}$, the winding voltage $V_{AUX}$ being substantially proportional to the output voltage $V_{OUT}$. During the ON time TOL1, the control signal $S_{SR}$ is used to turn on the synchronous rectifier switch NSR, so the voltage signal $V_{DET}$ becomes a negative value close to 0V (the voltage of the output ground line GNDO). As shown in FIG. 2, during the ON time TOL1, the waveforms of the magnetization current $I_{MAG}$ and the leakage inductance current $I_{PRM}$ begin to separate from each other. As the secondary winding LS of the transformer TF charges the output capacitor CO via the synchronous rectifier switch NSR, the magnetization current $I_{MAG}$ decreases substantially linearly at a relatively low speed. The leakage inductance current $I_{PRM}$ resonates relatively quickly due to the resonance circuit formed by the resonance capacitor CRS and the leakage inductance LL. The difference between the magnetization current $I_{MAG}$ and the leakage inductance current $I_{PRM}$ is substantially proportional to the current $I_{SEC}$ charging the output capacitor CO on the secondary side SEC.

In one embodiment, the power controller 104 records the fixed value $V_{RO}$ corresponding to the winding voltage $V_{AUX}$ during the ON time TOL1, and determines Time t14 according to the discharge duration TDISP in the previous switching cycle. As shown in FIG. 2, at Time t13, the winding voltage $V_{AUX}$ rises substantially to the fixed value $V_{RO}$. At Time t14, the ON time TOL1 is completed. At Time t15, a transition point or a knee point of the winding voltage $V_{AUX}$ falling from the fixed value $V_{RO}$ occurs, the fixed value $V_{RO}$ being referred to as the knee voltage. At Time t16, the winding voltage $V_{AUX}$ declines to pass across to 0V. The discharge duration TDISP of the transformer TF detected by the power controller 104 may substantially represent the duration of the transformer TF discharging the output capacitor CO detected by the primary side PRM. For example, the power controller 104 may detect the winding voltage $V_{AUX}$, record the discharge duration TDISP of the previous switching cycle, and control the ON time TOL1 of the current switching cycle to substantially equal to a fixed percentage such as: 80% the recorded discharge duration TDISP of the previous switching cycle. In one embodiment, the discharge duration TDISP may be from Time t13 to Time t15. In another embodiment, the discharge duration TDISP may be from Time t13 to Time t16.

In FIG. 2, the ON time TOH1 and the ON time TOL1 are not required to be equal, and the power controller 104 may control the ON time TOH1 and the ON time TOL1 asymmetrically.

The interval between Time t14 and Time t1E is the dead time TD12. During the dead time TD12, the high-side switch NHS and the low-side switch NHL (step SP7) are simultaneously turned off. Similar to the dead time TD11, the dead time TD12 may reduce the risk of a circuit breakdown owing to a short circuit between the input power line VIN and the input ground line GND1.

Step SP8 follows Step SP7. In Step SP8, the power controller 104 detects whether the winding voltage $V_{AUX}$ satisfies a trigger condition. So long as the trigger condition is not satisfied, the power controller 104 continues the dead time TD12. Once the trigger condition is satisfied, the power controller 104 executes Step SP2 to terminate the dead time TD12. For example, the trigger condition may be after the winding voltage $V_{AUX}$ deviates from the fixed value $V_{RO}$, the declining slope of the winding voltage $V_{AUX}$ exceeds a preset threshold. At Time t18, the power controller 104 determines that the trigger condition has been satisfied. Therefore, the power controller 104 terminates the switching cycle TCYC1 after the rest duration TD (Time t18 to Time 1E), and starts to turn on the high-side switch NHS for the next switching cycle. It should be understood that since the winding voltage $V_{AUX}$ may deviate from the fixed value $V_{RO}$, the winding voltage $V_{AUX}$ is not a fixed value.

Please refer to FIG. 2 and FIG. 3B. In Step SS2 of FIG. 3B, the secondary controller 106 provides a compensation signal according to the load 16 or the output voltage $V_{OUT}$ to determine a switching cycle time limit TBLNK (determined by the minimum period of switching cycles or the maximum switching frequencies of the high-side switch NHS or the low-side switch NHL). Regarding the implementation of the compensation signal determining the time limit TBLNK, the reference can be made to the patent application with the publication number CN101882875A. Various power supply devices that may adjust the switching frequency according to the load status (for example, the load 16 or the output voltage $V_{OUT}$) are disclosed in the patent application CN101882875A and several patent applications cited in the background. In this way, the power supply device may reduce the switching frequency by adjusting the duration of the switching cycle under the light-load and no-load conditions, so as to reduce the switching loss and improve the output efficiency.

In Step SS4, the secondary controller 106 determines that the voltage signal $V_{DET}$ has risen to the constant value $V_{RI}$ at time t11, so it is determined that the high-side switch NHS has been turned on in step SP2 and a switching cycle has started. Therefore, the secondary controller 106 starts to time the time. For example, the secondary controller 106 may use an error amplifier to compare the output voltage $V_{OUT}$ against the target voltage at which the output voltage $V_{OUT}$ is regulated and stabilized to generate the compensation signal, and then determine the switching cycle time limit TBLNK according to the compensation signal. The lower the output voltage $V_{OUT}$ is, the larger the difference between the output voltage $V_{OUT}$ and the target voltage and the higher the compensation signal are, resulting in a shorter switching cycle time limit TBLNK.

In Step SS6, the secondary controller 106 determines that the voltage signal $V_{DET}$ drops very quickly and becomes negative (less than the voltage on the output ground line GNDO) at Time t13, and determines that the high-side switch NHS is fully turned off in Step SP2. Therefore, the secondary controller 106 turns on the synchronous rectifier switch NSR to perform synchronous rectification.

In FIG. 2, at Time t15, the secondary controller 106 determines that the voltage signal $V_{DET}$ is about to change from a negative value to a positive value, that is, a rising knee point of the voltage signal $V_{DET}$ (the transition point of turning from a negative value) is about to occur. The interval from Time t13 to Time t15 is referred to as the discharge duration TDISS of the transformer TF, and may be detected by the secondary controller 106. During the discharge duration TDISS, the secondary side current $I_{SEC}$ is positive and charges the output capacitor CO, as shown in FIG. 2. The magnetization current $I_{MAG}$ drops to 0A at Time t15. Here, the secondary controller 106 uses the detection voltage signal $V_{DET}$ to determine whether the magnetization current $I_{MAG}$ is substantially 0A, that is, whether the magnetic flux induced by mutual inductance is almost exhausted, so as to determine whether the discharge duration TDISS of the transformer TF is completed.

In Step SS8 of FIG. 3B, the secondary controller 106 compares the discharge duration TDISS to the switching cycle time limit TBLNK to determine which one is reached first, that is, whether the knee point occurs earlier than the switching cycle time limit TBLNK. FIG. 2 shows that the discharge duration TDISS is completed earlier than reaching the switching cycle time limit TBLNK. Therefore, in Step SS9, the secondary controller 106 turns off the synchronous rectifier switch NSR upon completion of the discharge duration TDISS (at Time t15 or the knee point). In FIG. 2, the secondary controller 106 turns on the synchronous rectifier switch NSR for an ON time TS11 (from Time t13 to Time t15, the ON time TS11 is the same as the discharge duration TDISS) to perform synchronous rectification. The magnetization current $I_{MAG}$ is substantially positive during the ON time TOH1, the dead time TD11, and the ON time TS11.

In Step SS10, the secondary controller 106 turns on the synchronous rectifier switch NSR for an assisting duration TS12 (from Time t17 to Time t18). For example, between Time t15 and Time t17, the high-side switch NHS, the low-side switch NLS, and the synchronous rectifier switch NSR are all turned off, and the magnetic flux of the mutual inductance is exhausted at Time t15. Therefore, although the magnetization current $I_{MAG}$ slightly resonates owing to the residual electric energy of the parasitic capacitance in FIG. 2, the magnetization current $I_{MAG}$ may be regarded as 0A substantially between Time t15 and Time t17, and Time t15 to Time point t17 may be referred to as a non-magnetization duration TZM. The secondary controller 106 may start to turn on the synchronous rectifier switch NSR for the assisting duration TS12 when the first valley of the waveform of the voltage signal $V_{DET}$ occurs (at Time t17) upon reaching the switching cycle time limit TBLNK. During the assisting duration TS12, the output voltage $V_{OUT}$ is used to magnetize the transformer TF, resulting in a negative current $I_{SEC}$, reducing the magnetization current $I_{MAG}$ from 0A to negative, while increasing the leakage current $I_{PRM}$ to a positive value with time.

The assisting duration TS12 may, but is not limited to, have two functions: 1. assisting the high-side switch NHS to achieve ZVS; and 2. triggering the primary side PRM to start a new switching cycle.

After Time t18, the secondary controller 106 turns off the synchronous rectifier switch NSR. Because the magnetization current $I_{MAG}$ is negative, the magnetization current $I_{MAG}$ may force the leakage inductance current $I_{PRM}$ to negative at Time t18, thereby pulling up the voltage at the coupling node AN between the high-side switch NHS and the low-side switch NLS, the voltage at the coupling node AN may reach the same voltage as the input voltage $V_{IN}$, that is, reducing the voltage difference across the high-side switch NHS to 0V. Therefore, an appropriate length of the assisting duration TS12 may enable the high-side switch NHS to achieve ZVS.

The assisting duration TS12 is used to generate a negative magnetization current $I_{MAG}$ to enable the winding voltage $V_{AUX}$ to satisfy the trigger condition for starting the next switching cycle at Time t18, the trigger condition being that the winding voltage $V_{AUX}$ deviates from the fixed value $V_{RO}$ and the declining slope of the winding voltage $V_{AUX}$ exceeds than the preset threshold. In other words, the secondary controller 106 triggers the power controller 104 to start the next switching cycle by providing the assisting duration TS12, that is, the secondary controller 106 may trigger the power controller 104 to start the next switching cycle by enabling the primary winding voltage $V_{AUX}$ to change after the assisting duration TS12 is completed, thereby triggering the power controller 104 to start the next switching cycle. After the secondary controller 106 turns on the synchronous rectifier switch NSR for the assisting duration TS12, the primary-side power controller 104 detects that the trigger condition is satisfied, so as to turn on the high-side switch NHS to start the next switching cycle. In other words, the switching cycle TCYC1 is mainly controlled by the secondary controller 106, and the secondary controller 106 determines the switching cycle time limit TBLNK according to the load 16, and at the first valley of the voltage signal $V_{DET}$ after the switching cycle time limit TBLNK is reached, the synchronous rectifier switch NSR is turned on for the assisting duration TS12, so as to enable the switching cycle TCYC1 to be longer than the sum of the switching cycle time limit TBLNK and the assisting duration TS12.

Figure 4:
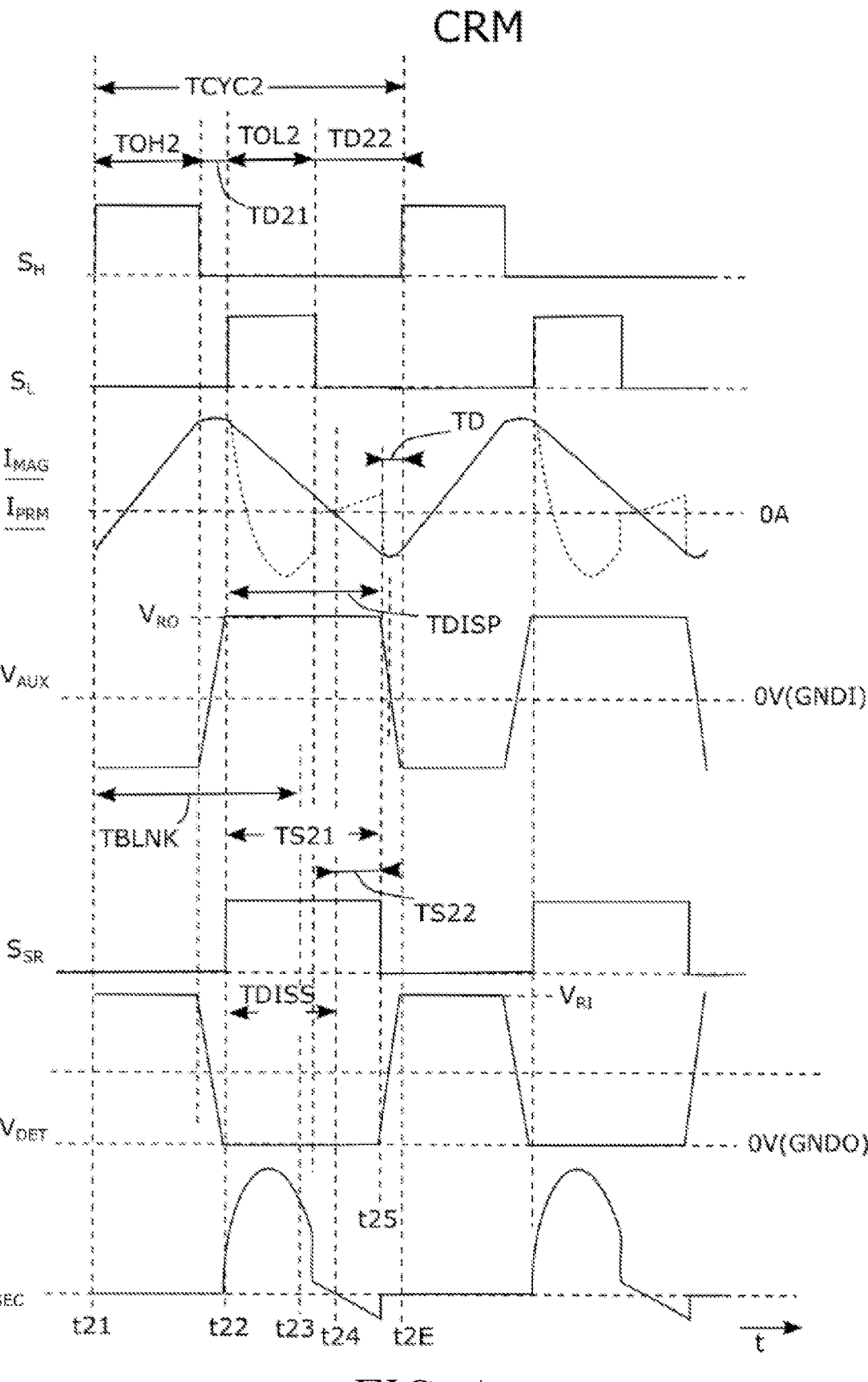
FIG. 4 shows the AHB power supply of FIG. 1 operating in CRM.

FIG. 4 shows a switching cycle TCYC2 (from Time t21 to Time t2E) and related waveforms when the AHB power supply 100 in FIG. 1 is operated in CRM. FIG. 4 is similar to FIG. 2, and explanation therefor may be found in the preceding paragraphs and will not be repeated here for brevity. The switching cycle TCYC2 has an ON time TOH2, a dead time TD21, an ON time TOL2, and a dead time TD22.

The explanation for the waveforms in FIG. 4 may refer to the control methods MP1 and MS1 in FIGS. 3A and 3B. As shown in FIG. 2, in the earlier first switching cycle TCYC1, when the AHB power supply 100 is operated in DCM, the switching cycle time limit TBLNK may be shorter and ended earlier, even earlier than the discharge duration TDISS (not shown in FIG. 2), or the switching cycle time limit TBLNK may be ended earlier than the knee point of the voltage signal $V_{DET}$ swinging from negative to positive at Time t15 (not shown in FIG. 2). In this way, in FIG. 3B, Step SS12 is executed after Step SS8. In a subsequent second switching cycle TCYC2, the AHB power supply 100 will be switched to CRM as shown in the left half in FIG. 4. The left half of FIG. 4 shows the waveforms of the AHB power supply 100 operating in CRM in the second switching cycle TCYC2. The secondary controller 106 does not turn off the synchronous rectifier switch NSR upon the completion of the discharge duration TDISS (at Time t24), but continues to turn on the synchronous rectifier switch NSR, so as to extend the assisting duration TS22.

In FIG. 4, the control signal $S_{SR}$ shows that the synchronous rectifier switch NSR is only turned on once at Time t22 in the switching cycle TCYC2, and remains turned on for an ON time TS21 until being turned off at Time t25. The ON time TS21 is equal to the sum of the discharge duration TDISS (the magnetization current $I_{MAG}$ and the current $I_{SEC}$ are both positive) and the assisting duration TS22 (the magnetization current $I_{MAG}$ and the current $I_{SEC}$ are both negative). The discharge duration TDISS may be determined by using a conventional method of detecting changes in the voltage signal $V_{DET}$, and the assisting duration TS22 may have a time length same as the assisting duration TS12 in the switching cycle TCYC1 in FIG. 2.

In the left half of FIG. 4, the AHB power supply 100 is operated in CRM in the second switching cycle TCYC2, and the switching cycle time limit TBLNK (from Time t21 to Time t23) is still ended earlier than the discharge duration TDISS (from Time t22 to Time t24), or the switching cycle time limit TBLNK is still ended earlier than the knee point of the voltage signal $V_{DET}$ transitioning from a negative value to a positive value (at Time t25). According to Step SS8 of FIG. 3B, in the third switching cycle, the AHB power supply 100 is still operated in CRM as shown in the waveforms in the right half of FIG. 4.

Similar to the assisting duration TS12 in FIG. 2, the assisting duration TS22 in FIG. 4 may have, but is not limited to, two functions: 1. Assist the high-side switch NHS to achieve ZVS; 2. Trigger the power controller 104 on the primary side PRM to start a new switching cycle.

In the foregoing embodiments, when the switching cycle TBLNK is completed earlier than (1) the discharge duration TDISS, or (2) the knee point of the voltage signal $V_{DET}$ swinging from a negative value to a positive value at Time t15, that is, when Step SS12 is executed after Step SS8 in FIG. 3B, the next switching cycle switch may be set to CRM. For example: the determination result of Step SS8 in the first switching cycle TCYC1 may enable switching to the CRM operations in the second switching cycle TCYC2, the determination result of Step SS8 in the second switching cycle TCYC2 may enable continuation of CRM operations in the third switching cycle TCYC3 (as shown in the right half of FIG. 4).

In another embodiment, if the computation speed of the timing circuit in the secondary controller 106 is fast, the relevant parameters of the time length may be changed immediately according to the determination result of Step SS8. If Step SS12 is executed after Step SS8 in FIG. 3B, the current switching cycle may be immediately switched to CRM. For example, the determination result of Step SS8 in the first switching cycle TCYC1 may result in switching to CRM in the first switching cycle TCYC1, and the determination result of Step SS8 in the second switching cycle TCYC2 may result in continuation of operating in CRM in the second switching cycle TCYC2.

In the embodiments in FIGS. 1, 2, 3A, 3B and 4, the power controller 104 turns on the high-side switch NHS, magnetizes the transformer TF and charges the resonance capacitor CRS, and the magnetization current $I_{MAG}$ increases. The power controller 104 turns off the high-side switch NHS for the transformer TF to charge the output capacitor CO and release the magnetic energy, so as to reduce the magnetization current $I_{MAG}$. The power controller 104 turns on the low-side switch NLS to partially transfer the energy stored in the resonance capacitor CRS to the output capacitor CO via the transformer TF. As mentioned above, the ON time TOL1 in FIG. 2 may be equal to a fixed percentage such as 80% of the discharge duration TDISP, that is, the power controller 104 finishes turning on the low-side switch NLS before the magnetization current $I_{MAG}$ is exhausted. In this manner, the power controller 104 and the secondary controller 106 will not be interfered by turning on of the low-side switch NLS, thereby accurately detecting the time when the magnetization current $I_{MAG}$ is 0A (about the knee point). In this way, the power controller 104 first records the discharge duration TDISP in the previous switching cycle, and accordingly turns off the low-side switch NLS before the predicted discharge duration TDISP of the current switching cycle is completed (for example, a fixed 80% time length of the discharge duration TDISP), so as to allow a transition point of the winding voltage $V_{AUX}$ or the voltage signal $V_{DET}$ to occur in the current cycle. In this way, the secondary controller 106 may detect the discharge duration TDISS, and control the synchronous rectifier switch NSR to perform the synchronous rectification. Moreover, during the non-magnetization duration TZM, that is, the time when the magnetization current $I_{MAG}$ is about 0A, the secondary controller 106 may turn on the synchronous rectifier switch NSR for the assisting duration to assist the high-side switch NHS to achieve ZVS. If the assisting duration follows the discharging time TDISS immediately, the non-magnetization duration TZM will not be present as in FIG. 4. In FIG. 4, when the AHB power supply 100 is operated in CRM, the synchronous rectifier switch NSR is only turned on once in each switching cycle, so that the synchronous rectifier switch NSR may provide (1) synchronous rectification (the discharge duration TDISS) in a short time, and (2) a ZVS pulse (the assisting duration TS22), thereby shortening the entire switching cycle, enabling a higher switching frequency to meet the heavy load requirements.

Figure 5:
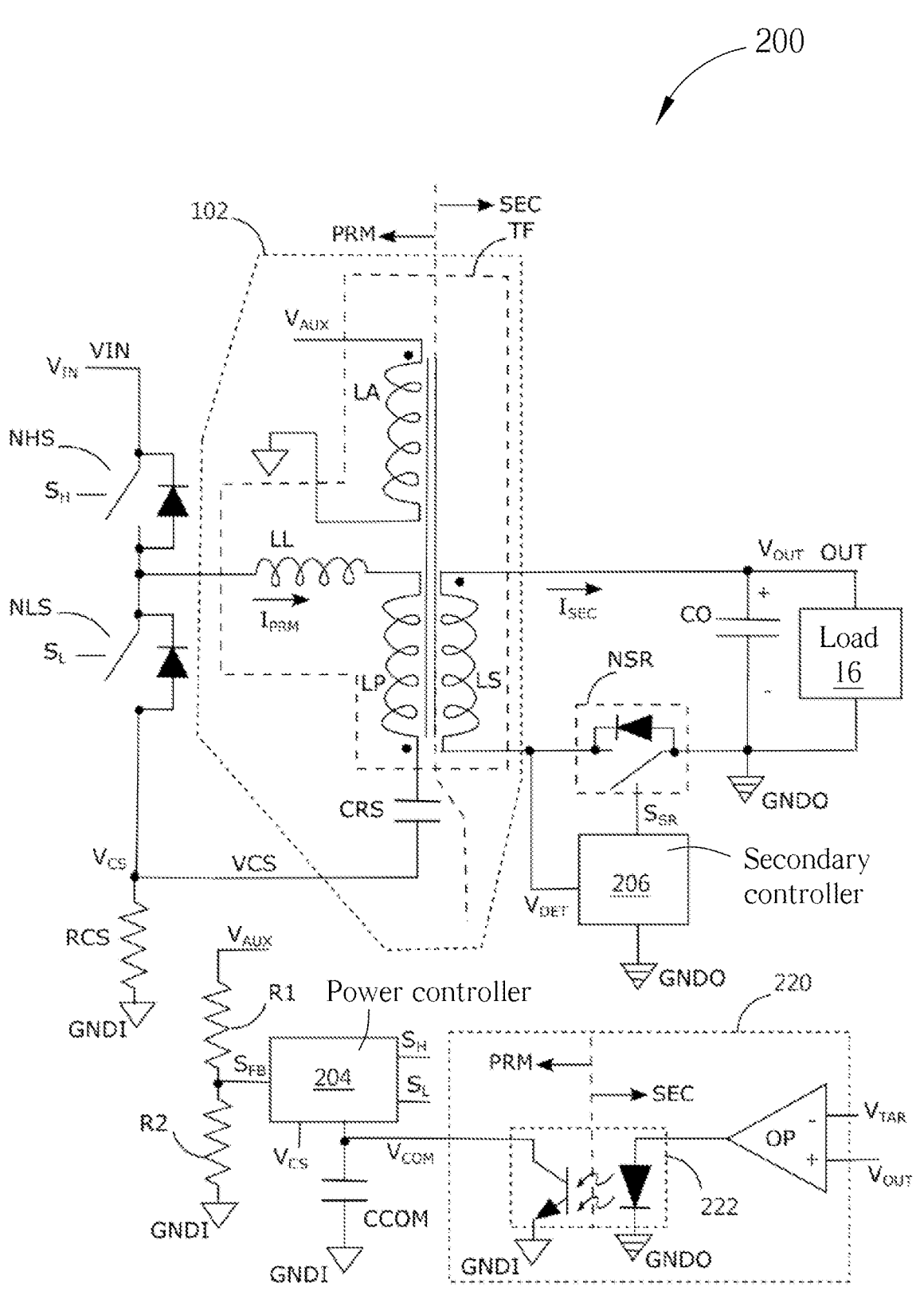
FIG. 5 shows an AHB power supply according to another embodiment of the invention.

The invention is not limited to the AHB power supply having the photo-less structure, and is also applicable to the AHB power supply having the photocoupler structure. FIG. 5 shows an AHB power supply 200 having the optical coupling structure according to another embodiment of the invention. Various components in FIG. 5 are similar or identical to the components in FIG. 1, and the explanation therefor may be found in the preceding paragraphs and will not be repeated here. The AHB power supply 200 is different from the AHB power supply 100 in that the AHB power supply 200 further includes a compensation circuit 220. The compensation circuit 220 includes an error amplifier OP and a photo coupler 222. The compensation circuit 220 generates the compensation signal $V_{COM}$ across the compensation capacitor CCOM of the primary side PRM substantially according to the condition of the load 16 of the secondary side SEC. The secondary controller 206 controls the synchronous rectifier switch NSR to not only provide synchronous rectification, but also assist the high-side switch NHS to achieve ZVS.

FIG. 2 further shows waveforms in the switching cycle TCYC1 for the AHB power supply 200 operated in DCM, and FIG. 4 further shows waveforms in the switching cycle TCYC2 for the AHB power supply 200 operated in CRM. The control methods MP1 and MS1 in FIGS. 3A and 3B may further be used in the power controller 204 and the secondary controller 206 in FIG. 5. It should be noted that when adopting the control method MP1 of FIG. 3A, the power controller 204 includes a correspondence between the compensation signal $V_{COM}$ and the ON time TOH1. The power controller 204 determines the ON time TOH1 according to the compensation signal $V_{COM}$. The heavier the load 16 is, the higher the compensation signal $V_{COM}$ and the longer the ON time TOH1 will be.

In FIG. 2 and FIG. 4, the assisting durations TS21 and TS22 of the synchronous rectifier switch NSR are used to extract energy from the output voltage $V_{OUT}$ to magnetize the transformer and generate a negative magnetization current $I_{MAG}$ to assist the high-side switch NHS to achieve ZVS. If the assisting duration is too short and the absolute value of the negative magnetization current $I_{MAG}$ is small, the high-side switch NHS may not be able to achieve ZVS. If the assisting duration is too long, the absolute value of the negative magnetization current $I_{MAG}$ is too large, while the high-side switch NHS can achieve ZVS for sure, but too much energy is converted from the secondary side SEC to the primary side PRM, resulting in unnecessary losses.

In FIG. 2, there is a rest duration TD between the assisting duration TS12 of the synchronous rectifier switch NSR and Time t1E (end of the switching cycle TCYC1). A rest duration TD is also present in FIG. 4, and the rest duration TD is present between the assisting duration TS22 in FIG. 4 and Time t2E. During the rest duration TD, the synchronous rectifier switch NSR, the high-side switch NHS, and the low-side switch NLS are all turned off.

In an embodiment of the invention, the secondary controller located on the secondary side SEC may be adaptively and automatically adjust the assisting duration according to the change of the voltage signal $V_{DET}$ in the rest duration TD (equal to the voltage change of the secondary winding LS or the first auxiliary winding LA), so as to optimize the ZVS of high-side switch NHS. For example, the secondary controller 106 in FIG. 1 may optimize the assisting duration of the next switching cycle according to the change of the voltage signal $V_{DET}$ in the rest duration TD.

Figures 6, 7A, 7B:
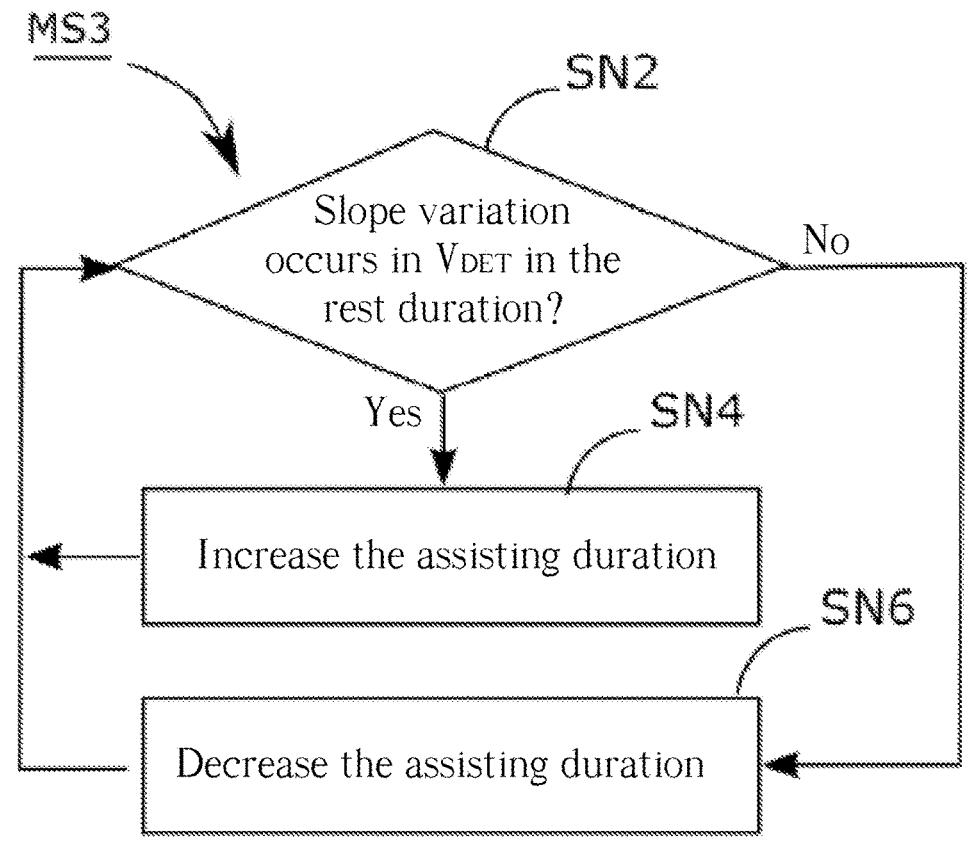
FIG. 6 shows a control method MS3 adopted by the secondary controller in FIG. 1.
FIG. 7A shows an assisting duration TN1 and a rest duration TD1 in a switching cycle.
FIG. 7B shows an assisting duration TN2 and a rest duration TD2 in a switching cycle.

FIG. 6 shows a control method MS3 for the secondary controller in FIG. 1 and FIG. 5, and the control method MS3 is used to optimize the assisting duration. The control method MS3 may also be applied to the secondary controller 206 in FIG. 5. FIG. 7A shows an assisting duration TN1 and a rest duration TD1 in a switching cycle. FIG. 7B shows an assisting duration TN2 and a rest duration TD2 in another switching cycle.

In Step SN2 in FIG. 6, the secondary controller 106 detects whether the waveform of the voltage signal $V_{DET}$ has a slope variation during the rest duration TD. For the case shown in FIG. 7A, the synchronous rectifier switch NSR is first turned on for the assisting duration TN1 and then turned off, so that the voltage signal $V_{DET}$ may rise slowly with a gentle slope during the rest duration TD1. However, the assisting duration TN1 is relatively short, and when the rest duration TD1 is completed, the voltage signal $V_{DET}$ is still less than the constant value $V_{RI}$. When the rest duration TD1 is completed, the control signal $_{SH}$ turns on the high-side switch NHS, so that the waveform of the voltage signal $V_{DET}$ rises quickly to the fixed value $V_{RI}$ with a relatively steep slope; the difference between the two slopes generates a slope variation FD as shown in FIG. 7A. In one embodiment, the secondary controller 106 detects whether the slope change of the voltage signal $V_{DET}$ in the rest duration TD is greater than a threshold. If the slope change exceeds the threshold, a slope variation FD has occurred. If the slope change does not exceed the threshold in the rest duration TD1, the slope variation FD has not occurred. The slope variation FD may also be detected by other methods. For example, the slope variation FD shows that the curvature of the voltage signal $V_{DET}$ changes from negative to positive. In another embodiment, the secondary controller 106 may use two differentiators to differentiate the voltage signal $V_{DET}$ twice during the rest duration TD1 to generate the curvature of the voltage signal $V_{DET}$ for identifying the slope variation FD. The occurrence of the slope variation FD indicates that the high-side switch NHS fails to achieve ZVS. Therefore, in the case as in FIG. 7A, Step SN4 is executed after Step SN2 to increase the assisting duration of the next switching cycle.

For the case shown in FIG. 7B, the assisting duration TN2 is longer compared to the assisting duration TN1, the rising voltage signal $V_{DET}$ is clamped at a fixed voltage $V_{RJ}$ via the body diode of the high-side switch NHS to ensure that the high-side switch NHS achieves ZVS before the rest duration TD2 is completed. In FIG. 7B, the waveform of the voltage signal $V_{DET}$ does not have the slope variation FD as in FIG. 7A. In one embodiment, none of the slope changes in the rest duration TD2 exceeds the threshold, indicating that the slope variation FD does not occur. In another embodiment, two differentiations are performed on the voltage signal $V_{DET}$ in FIG. 7B to determine that the slope variation FD does not occur, since the curvature of the waveform of the voltage signal $V_{DET}$ is negative during the rest duration TD2. Therefore, in the case as in FIG. 7B, Step SN6 is executed after Step SN2 to reduce the assisting duration of the next switching cycle.

Accordingly, the control method MS3 in FIG. 6 may optimize the assisting duration in the switching cycle, so that the length of the assisting duration may be just enough to enable the slope variation FD to occur according to the switching cycle, that is, the length of the assisting duration may be just enough to provide enough electric energy to enable the high-side switch NHS to achieve ZVS.

The patent application with publication number TW202135452A discloses a modulation control method suitable for Active Clamping Flyback (ACF) power converters to adjust the ON time TONH of the active clamping switch QQH. In the another embodiment tor the control method MS3 in FIG. 6, the implementation for adjusting the assisting duration TN2 of the next switching cycle may refer the patent application TW202135452A, where a first sample value (related to the peak value PEAK of the secondary winding current during the resonance period) and a third sample value (related to the value of the secondary winding current when the primary-side main switch is turned on) are compared to generate a comparison result, thereby adjusting the ON time TONH of the active clamp switch QQH.

In an embodiment of the invention, the power controller on the primary side PRM may adaptively and automatically adjust the rest duration TD of the next switching cycle according to the change of the winding voltage $V_{AUX}$ in the rest duration TD, so as to optimize the high-side switch NHS ZVS. For example, the power controller 104 in FIG. 1 may adjust the length of the rest duration TD of the next switching cycle according to the change of the winding voltage $V_{AUX}$ during the rest duration TD.

Figures 8, 9A, 9B:
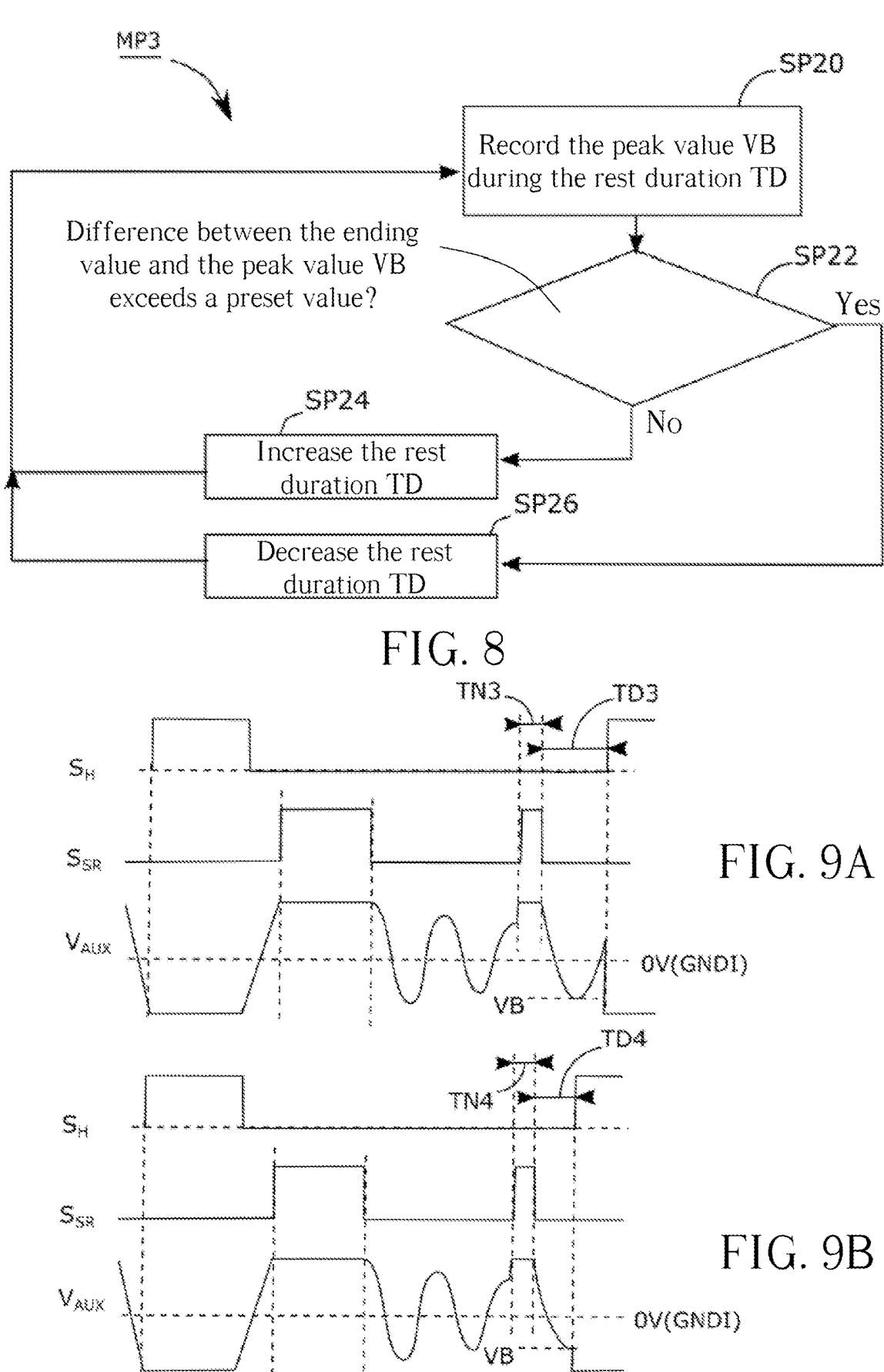
FIG. 8 shows a control method MP3 adopted by the power controller 104.
FIG. 9A shows an assisting duration TN3 and a rest duration TD3 in a switching cycle.
FIG. 9B shows an assisting duration TN4 and a rest duration TD4 in another switching cycle.

FIG. 8 shows a control method MP3 for the power controllers in FIGS. 1 and 5 to optimize the rest duration TD. The rest duration TD may be completed just when the winding voltage $V_{AUX}$ substantially reaches an peak value VB. The control method MP3 may also be applied to the power controller 204. FIG. 9A shows an assisting duration TN3 and a rest duration TD3 in a switching cycle. FIG. 9B shows an assisting duration TN4 and a rest duration TD4 in another switching cycle.

In Step SP20 of FIG. 8, the power controller 104 records the peak value VB of the winding voltage $V_{AUX}$ during the rest duration TD. For example, a peak hold circuit may be used to determine the minimum value of the winding voltage $V_{AUX}$ in the rest duration TD and record the minimum value as the peak value VB. In Step SP22, the power controller 104 compares the ending value of the winding voltage $V_{AUX}$ when the rest duration TD is completed with the peak value VB to determine a difference between the ending value and the peak value VB. If the winding voltage $V_{AUX}$ is significantly different (greater than a preset value) from the peak value VB upon the completion of the rest duration TD, Step SP24 may be executed to reduce the rest duration TD of the next switching cycle. Conversely, if the winding voltage $V_{AUX}$ when the rest duration TD is completed is substantially equal to the peak value VB, Step SP26 may be executed to increase the rest duration TD of the next switching cycle.

For example, the power controller 104 may start turning on the high-side switch NHS upon the completion of the rest duration TD. However, the high-side switch NHS has not yet activated upon the completion of the rest duration TD due to a short delay. The power controller 104 may record the ending value of the winding voltage $V_{AUX}$ (e.g., by measuring the winding voltage $V_{AUX}$) when the rest duration TD is completed and the high-side switch NHS has not been turned on, and may compare the ending value with the peak value VB. The high-side switch NHS is turned on after recording the ending value of the winding voltage $V_{AUX}$.

In some embodiments, the power controller 104 presets the rest duration TD3 to longer at the beginning of the switching cycle shown in FIG. 9A. Therefore, the power controller 104 records the peak value VB during the rest duration TD3, and the rest duration TD3 is completed after the peak value VB occurs. Therefore, the winding voltage $V_{AUX}$ upon the completion of the rest duration TD3 in FIG. 9A will be significantly larger than the peak value VB, and the voltage difference between the winding voltage $V_{AUX}$ and the peak value VB is greater than the preset value. According to Step SP22 in FIG. 8, Step SP26 may be used to reduce the rest duration TD of the next switching cycle.

In the switching cycle of FIG. 9B, the power controller 104 presets the rest duration TD4 to a relatively short length, and the rest duration TD4 is completed when the winding voltage $V_{AUX}$ is about to reach the valley. Therefore, upon the completion of the rest duration TD4, the winding voltage $V_{AUX}$ is substantially equal to the peak value VB, and the voltage difference between the two is less than the preset value. So Step SP26 will increase the rest duration TD of the next switching cycle. In this way, using the difference between the winding voltage $V_{AUX}$ and the peak value VB upon the completion of the rest duration TD, the rest duration TD may be adjusted so that the rest duration TD is completed substantially when the peak value VB occurs.

It may be seen from FIGS. 9A and 9B that the control method MP3 in FIG. 8 may enable the rest duration TD to be completed substantially when the winding voltage $V_{AUX}$ is at the minimum. When the winding voltage $V_{AUX}$ is at the minimum, the voltage across the high-side switch NHS will also be the minimum. At this time, the power controller 104 turns on the high-side switch NHS to achieve ZVS as much as possible. The patent application with publication number TW202135452A discloses a modulation control method suitable for Active Clamping Flyback (ACF) power converters to adjust the dead time TDEAD between the ON time of the active clamping switch QQH and the ON time of the main switch QQL. In the another embodiment tor the control method MS3 in FIG. 6, the implementation for adjusting the rest duration TD2 of the next switching cycle may refer the patent application TW202135452A, where the first sample value (related to the peak value PEAK of the secondary winding current during the resonance period) and a second sample value (related to the value of the secondary winding current immediate before the main switch is turned on) are compared to generate a comparison result, thereby adjusting the dead time TDEAD between the ON time of the active clamp switch QQH and the ON time of the main switch QQL.

The AHB power supplies 100 and 200 in FIGS. 1 and 5 both use the synchronous rectifier switch NSR located on the secondary side SEC as the assisting switch. When the magnetization current $I_{MAG}$ is about 0A, the assisting switch is turned on for a period of time, and the magnetization current $I_{MAG}$ is negative via the secondary winding LS to assist the high-side switch NHS to achieve ZVS in the next switching cycle. However, the invention is not limited thereto.

FIG. 10 shows an AHB power supply 300 according to another embodiment of the invention. Various components of the AHB power supply 300 are similar or identical to the components of the AHB power supply 200, and the explanation therefor may be found in the preceding paragraphs and will not be repeated here. The AHB power supply 300 further has an assisting switch NA, an auxiliary capacitor CAS, and a second auxiliary winding LA2 of the transformer TF2 on the primary side PRM, and the connections thereof are shown in FIG. 10. The power controller 304 generates a control signal $S_A$ to control the assisting switch NA. The auxiliary capacitor CAS provides the voltage $V_{AS}$. When the magnetization current $I_{MAG}$ is about 0A, the assisting switch NA is turned on for the assisting duration, the voltage $V_{AS}$ enables the magnetization current $I_{MAG}$ to go negative via the second auxiliary winding LA2, so as to assist the high-side switch NHS to achieve ZVS in the next switching cycle.

Figure 11:
FIG. 11 and FIG. 12 show the AHB power supply of FIG. 10 operating in DCM and CRM, respectively.

FIG. 11 shows waveforms in a switching cycle TCYC6 (from Time t61 to Time t6E) for the AHB power supply 300 operated in DCM. FIG. 11 is similar to FIG. 2, and the explanation for the similar parts will not be repeated here. Compared to FIG. 2, FIG. 11 further includes a control signal $S_A$ between the winding voltage $V_{AUX}$ and the control signal $S_{SR}$, the waveform of the control signal $S_A$ represents the state of the assisting switch NA. In FIG. 11, the power controller 304 determines the ON time TOH6 and the limit time TBLNK of the switching cycle according to the compensation signal $V_{COM}$ in FIG. 10.

As shown in FIG. 11, when the ending time of the switching cycle TBLNK occurs after the ending time of the discharge duration TDISP (the knee point at which the winding voltage $V_{AUX}$ starts to drop), similar to Steps SS8 and SS10 in FIG. 3B, the power controller 304 turns on the assisting switch NA for the assisting duration TSA using the control signal $_{SA}$ at the first peak (Time t62) of the winding voltage $V_{AUX}$. After the switching cycle time limit TBLNK is ended. After the assisting duration TSA is completed and the rest duration TD passes (Time t6E), the power controller 304 terminates the switching cycle TCYC6. During the assisting duration TSA, the voltage $V_{AS}$ passes via the second auxiliary winding LA2 to generate a negative magnetization current $I_{MAG}$, as shown in FIG. 11. By turning on the assisting switch NA for the conduction assisting duration TSA, the voltage difference between the two is completed of the high-side switch NHS may be reduced to 0V, enabling the high-side switch NHS to achieve ZVS.

FIG. 11 is different from FIG. 2 in that the control signal $S_{SR}$ is used to turns on the synchronous rectifier switch NSR only once to perform synchronous rectification (ON time TS61), and is not completed after the magnetization current $I_{MAG}$ reaches approximately 0A, that is, the synchronous rectifier switch NSR is further turned on for an assisting duration after the discharge duration TDISP is completed. In other words, the assisting duration for reducing the magnetization current $I_{MAG}$ from 0A to a negative value is performed by the synchronous rectifier switch NSR in FIG. 2, but is performed by the assisting switch NA in FIG. 11. Compared to FIG. 2, the current $I_{SEC}$ in FIG. 11 is substantially positive, so the AHB power supply 300 in FIG. 10 can reduce the losses owing to the output voltage $V_{OUT}$, being easier to maintain the stability of the output voltage $V_{OUT}$.

Figure 12:
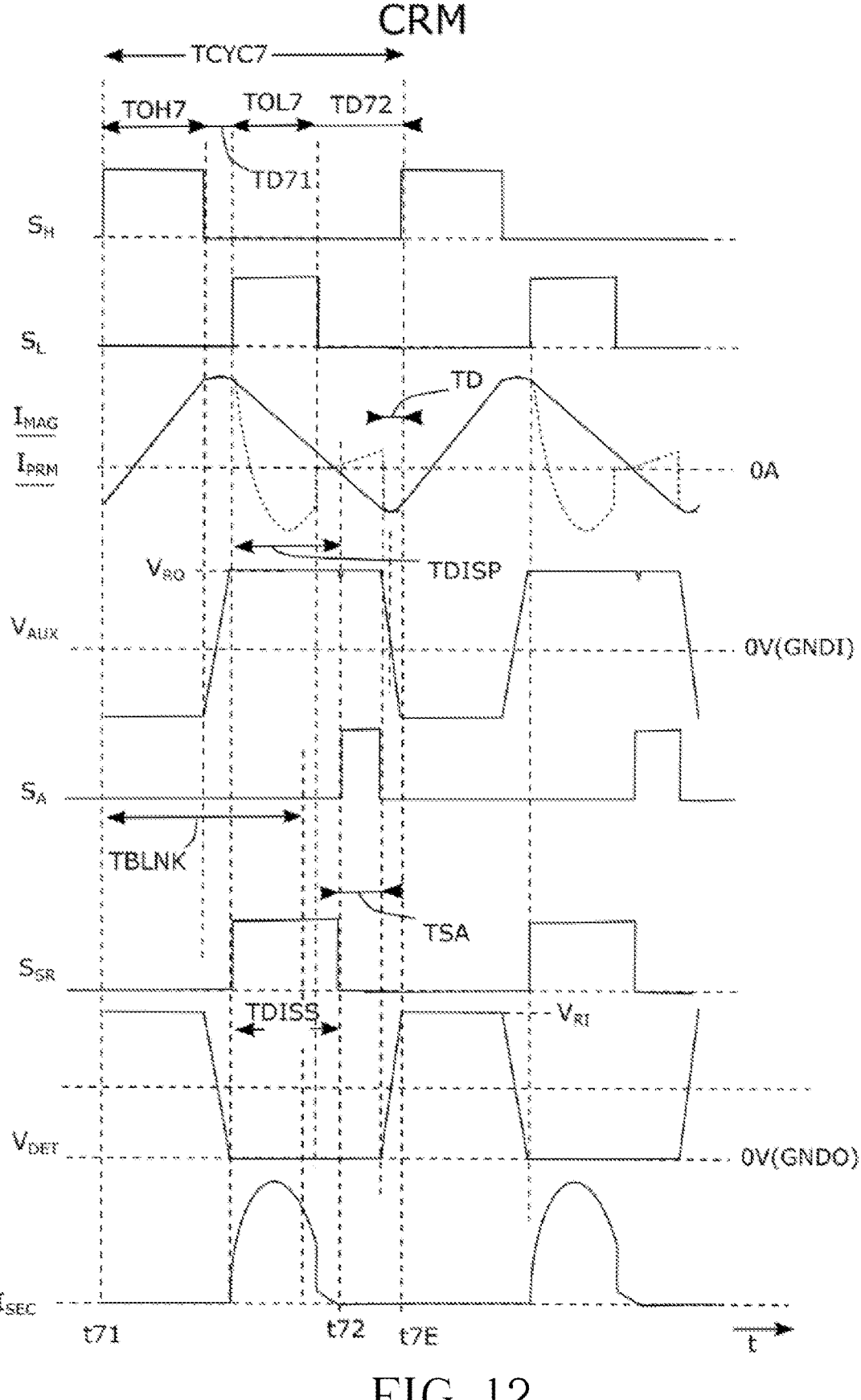

FIG. 12 shows a switching cycle TCYC6 (from Time t61 to Time t6E) and related waveforms when the AHB power supply 300 in FIG. 10 is operated in CRM. FIG. 12 is similar to FIG. 4, and the explanation for the similar parts will not be repeated here. Compared to FIG. 4, FIG. 12 further includes a control signal $S_A$ between the winding voltage $V_{AUX}$ and the control signal $S_{SR}$, the waveform of the control signal $S_A$ represents the state of the assisting switch NA.

Comparing FIG. 12 to FIG. 4, the synchronous rectifier switch NSR reduces the magnetization current $I_{MAG}$ from 0A to a negative value in the assisting duration TS22 in FIG. 4, while the assisting switch NA reduces the magnetization current $I_{MAG}$ in the assisting duration TSA rather than assisting duration TS22 in FIG. 12.

In FIG. 11, when the AHB power supply 300 is operated in DCM in the switching cycle TCYC6, the switching cycle time limit TBLNK may be shorter and ended earlier, even earlier than the discharge duration TDISP (not shown in FIG. 11), or the switching cycle time limit TBLNK may be ended earlier than the knee point of the winding voltage $V_{AUX}$ decreasing from the fixed value $V_{RO}$ (not shown in FIG. 11). According to Step SS8 of FIG. 3B, in the subsequent switching cycle TCYC7, the AHB power supply 300 will be changed to CRM in the next switching cycle. In FIG. 3B, Step SS12 is executed after Step SS8, corresponding to the waveforms of the CRM operations in the switching cycle TCYC7 in the left half of FIG. 12, when the discharge duration TDISP is completed, that is, at Time t72, the first knee point occurs, the power controller 304 turns on the assisting switch NA so that the assisting switch NA remains on for the assisting duration TSA. As shown in FIG. 12, the winding voltage $V_{AUX}$ will drop slightly at Time t72 because the magnetization current $I_{MAG}$ drops to 0A, indicating the first knee point upon the completion of the discharge duration TDISP. The assisting switch NA is then turned on, and the winding voltage $V_{AUX}$ returns to the constant value $V_{RO}$, and when the assisting duration TSA is completed, the second knee point occurs in the winding voltage $V_{AUX}$ to turn off the assisting switch NA. FIG. 12 also shows that the current $I_{SEC}$ are substantially positive, and thus it is easier for the AHB power supply 300 in FIG. 10 to maintain the stability of the output voltage $V_{OUT}$.

In the left half of FIG. 12, the AHB power supply 300 is operated in CRM in the switching cycle TCYC7, and the limit time TBLNK of the switching cycle is still ended earlier than the knee point (Time t72) signifying the end of the discharge duration TDISP. In this manner, according to Step SS8 of FIG. 3B, in the subsequent switching cycle, the AHB power supply 300 is still operated in CRM as in the waveforms of the next switching cycle in the right half of FIG. 12. The assisting duration TSA in FIG. 12 may be the time length of the assisting duration TSA generated according to the DCM in the switching cycle TCYC6.

In the foregoing embodiments, when the switching cycle time limit TBLNK is completed earlier than (1) the discharge duration TDISP or (2) the knee point of the winding signal $V_{AUX}$, that is, when Step SS12 is executed after Step SS8 in FIG. 3B, the next switching cycle switch may be set to CRM. For example: the determination result of Step SS8 in the sixth switching cycle TCYC6 may enable switching to the CRM operations in the seventh switching cycle TCYC7, the determination result of Step SS8 in the second seventh cycle TCYC7 may enable continuation of the CRM operations in the eighth switching cycle TCYC8 (as shown in the right half of FIG. 12).

In another embodiment, if the computation speed of the timing circuit in the power controller 304 is fast, the relevant parameters of the time length may be changed immediately according to the determination result of Step SS8. If Step SS12 is executed after Step SS8, the current switching cycle may be immediately switched to CRM. For example, the determination result of Step SS8 in the first switching cycle TCYC1 may result in switching to CRM in the first switching cycle TCYC1, and the determination result of Step SS8 in the second switching cycle TCYC2 may result in continuation of operating in CRM in the second switching cycle TCYC2.

In FIG. 10, the secondary controller 306 only performs synchronous rectification without enabling the high-side switch NHS to achieve ZVS, nor triggering the primary side PRM power controller 304 to start a new switching cycle. In the embodiment of FIG. 10, the control method MS3 shown in FIG. 6 and the control method MP3 shown in FIG. 8 are executed by the primary side power controller 304, that is, the primary side power controller 304 may optimize the assisting duration TSA and rest duration TD in FIGS. 11 and 12.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an asymmetric half-bridge power supply, wherein the asymmetric half-bridge power supply comprises:
   a resonance circuit comprising:
      a first auxiliary winding;
      a transformer comprising a primary winding and an assisting winding inductively coupled to each other, and
      a resonance capacitor coupled to the primary winding;
   a first switch and the second switch coupled in series between an input power line and an input ground line to control the resonance circuit, one terminal of the first switch and one terminal of the second switch being coupled to an output node; and
   an assisting switch coupled to the assisting winding;

the control method being performed in a switching cycle and comprising:
   turning on the first switch for a first ON time after a declining slope of a winding voltage of the first auxiliary winding exceeds a preset threshold;
   turning on the second switch for a second ON time after an end of the first ON time;
   detecting a discharge duration of the transformer after an end of the second ON time; and
   turning on the assisting switch for an assisting duration after the discharge duration, so as to assist the first switch to achieve zero-voltage switching in a next switching cycle via the assisting winding.

2. The method of claim 1, wherein the first auxiliary winding is located on a primary side of the transformer, the method further comprising:
   turning off the first switch, the second switch and the assisting switch for a rest duration after the assisting duration;
   recording a peak value of the winding voltage of the first auxiliary winding during the rest duration;
   recording an ending value of the winding voltage of the first auxiliary winding upon an end of the rest duration, and then turning on the first switch; and
   adjusting a rest duration of the next switching cycle according to a difference between the peak value and the ending value of the winding voltage of the first auxiliary winding.

3. The method of claim 1, wherein the assisting winding is a secondary winding, the primary winding and the first auxiliary winding are both located on a primary side of the transformer, and the secondary winding is located on a secondary side of the transformer.

4. The method of claim 3, wherein the asymmetric half-bridge power supply further comprises a synchronous rectification switch located on the secondary side, the synchronous rectification switch is configured to provide a synchronous rectification function, the assisting switch is the synchronous rectification switch, and the synchronous rectification switch is coupled to the secondary winding.

5. The method of claim 3, wherein the switching cycle comprises the rest duration, the method further comprising:
   adjusting an assisting duration of the next switching cycle according to a slope of a winding voltage of the assisting winding during the rest duration; and
   when a slope variation occurs in the winding voltage of the assisting winding, increasing the assisting duration of the next switching cycle.

6. The method of claim 1, wherein:
   the asymmetric half-bridge power supply further comprises a primary side controller; and
   the method further comprises:
   *the primary side controller determining a duration of the switching cycle based on a time difference between two consecutive times when the first arm switch is turned on from an off state without a photo coupler disposed between a primary side and a secondary side of the transformer; the primary side controller adjusting the first ON time according to the duration of the switching cycle determined in a previous switching cycle.

7. The method of claim 1, wherein turning on the assisting switch for the assisting duration comprises:
   turning on the assisting switch for the assisting duration to generate a negative magnetization current to enable the declining slope of the winding voltage of the first auxiliary winding exceeding the preset threshold.

8. The method of claim 1, wherein turning on the assisting switch for the assisting duration after the discharge duration comprises:

turning on the assisting switch for the assisting duration upon an end of the discharge duration.

9. The method of claim 1, wherein turning on the assisting switch for the assisting duration after the discharge duration comprises:

turning off the assisting switch for a non-magnetization duration upon an end of the discharge duration; and turning on the assisting switch for the assisting duration after the non-magnetization duration.

10. The method of claim 1, further comprising:

providing a switching cycle time limit according to an output voltage; and turning on the assisting switch after end of the first ON time;

wherein, when the switching cycle time limit is reached earlier than an end of the discharge duration, turning on the assisting switch for the assisting duration upon the end of the discharge duration;

wherein, when the switching cycle time limit is reached later than the end of the discharge duration, turning off the assisting switch for a non-magnetization duration upon the end of the discharge duration, and then turning on the assisting switch for the assisting duration after the non-magnetization duration.

11. The method of claim 1, wherein the transformer comprises a second auxiliary winding, the assisting winding is the second auxiliary winding, and the assisting switch, the primary winding, the first auxiliary winding and the second auxiliary winding are all located on the primary side, and the assisting switch is coupled between the second auxiliary winding and an assisting capacitor;

wherein the switching cycle comprises a rest duration, and the method further comprises:

adjusting an assisting duration of the next switching cycle according to a slope of the winding voltage of the first auxiliary winding during the rest duration; and increasing the assisting duration of the next switching cycle when a slope variation occurs in the slope of the winding voltage of the first auxiliary winding.

12. A control method of an asymmetric half-bridge power supply comprising:

asymmetrically controlling a first ON time of a first switch and a second ON time of a second switch to convert an input voltage into an output voltage via a transformer, the transformer comprising a primary winding, a first auxiliary winding and a secondary winding, wherein the first switch and the second switch control a resonance circuit, the resonance circuit comprises the transformer and a resonance capacitor, and the secondary winding is coupled to a synchronous rectifier switch;

providing a switching cycle time limit according to the output voltage;

turning on the synchronous rectifier switch for an assisting duration after the switching cycle time limit is reached;

turning on the first switch to start a switching cycle after turning on the synchronous rectifier switch for the assisting duration;

detecting a winding voltage of the first auxiliary winding, wherein during the second ON time, the winding voltage of the first auxiliary winding is a substantially constant value; and turning on the first switch when the winding voltage deviates from the substantially constant value and a declining slope of the winding voltage exceeds a preset threshold.

13. An asymmetrical half-bridge power supply for converting an input voltage on a primary side to an output voltage on a secondary side, the asymmetrical half-bridge power supply comprising:

a resonance circuit comprising:

a transformer comprising a primary winding, a first auxiliary winding and an assisting winding, and a resonance capacitor coupled to the primary winding;

a first switch and a second switch arranged on the primary side coupled in series between an input power line and an input ground line to control a magnetization current flowing through the resonance circuit;

an assisting switch coupled to the assisting winding; and a power controller configured to first turn on the first switch for a first ON time and then turn on the second switch for a second ON time in a switching cycle, wherein the power controller turns on the first switch for the first ON time after a declining slope of a winding voltage of the first auxiliary winding exceeds a preset threshold;

wherein, after a discharge duration of the transformer is completed, the assisting switch is turned on for an assisting duration to enable one of the first switch and the second switch to achieve zero-voltage switching in a next switching cycle.

14. The asymmetric half-bridge power supply of claim 13, wherein the assisting winding is a secondary winding, and the assisting switch is a synchronous rectification switch coupled to the secondary winding.

15. The asymmetric half-bridge power supply of claim 14, further comprising a secondary controller configured to control the synchronous rectification switch, turn on the synchronous rectification switch after an end of the first ON time, and turn on the synchronous rectifier switch for the assisting duration upon completion of the discharge duration.

16. The asymmetric half-bridge power supply of claim 14, further comprising a secondary controller configured to control the synchronous rectification switch, and to:

turn on the synchronous rectification switch after an end of the first ON time;

turn off the synchronous rectifier switch for a non-magnetization duration upon the completion of the discharge duration; and turn on the assisting switch for the assisting duration after the non-magnetization duration.

17. The asymmetric half-bridge power supply of claim 14, further comprising a secondary controller configured to control the synchronous rectification switch, and adjust the assisting duration of the next switching cycle according to the voltage signal of the secondary winding during a rest duration, the rest duration being after the assisting duration and before the next switching cycle.

18. The asymmetric half-bridge power supply of claim 14, further comprising a secondary controller configured to control the synchronous rectification switch, and trigger the power controller to start the next switching cycle via the winding voltage of the first auxiliary winding upon completion of the assisting duration.

19. The asymmetric half-bridge power supply of claim 14, wherein the asymmetric half-bridge power supply has a photo-less structure, and the first ON time is determined according to a previous switching cycle.

20. The asymmetric half-bridge power supply of claim 13, wherein the assisting switch is turned on for the assisting duration to generate a negative magnetization current for the declining slope of the winding voltage of the first auxiliary winding to exceed the preset threshold.

* * * * *